United States Patent
Dube

(10) Patent No.: US 8,986,640 B1
(45) Date of Patent: Mar. 24, 2015

(54) SYSTEM AND METHOD FOR RECOVERING AMMONIA FROM A CHILLED AMMONIA PROCESS

(71) Applicant: ALSTOM Technology Ltd, Baden (CH)

(72) Inventor: Sanjay Kumar Dube, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/149,315

(22) Filed: Jan. 7, 2014

(51) Int. Cl.
*B01D 53/58* (2006.01)
*B01D 53/62* (2006.01)
*B01D 53/75* (2006.01)
*B01D 53/78* (2006.01)
*B01D 53/96* (2006.01)

(52) U.S. Cl.
CPC ............... *B01D 53/62* (2013.01); *B01D 53/96* (2013.01)
USPC ..................................................... 423/237

(58) Field of Classification Search
CPC ......... B01D 53/58; B01D 53/62; B01D 53/75; B01D 53/78
USPC .................................. 423/237, 238
See application file for complete search history.

(56) References Cited

U.S. PATENT DOCUMENTS

| | | |
|---|---|---|
| 1,897,725 A | 2/1933 | Gaus et al. |
| 2,043,109 A | 6/1936 | McKee et al. |
| 2,106,734 A | 2/1938 | Gollmar |
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |

(Continued)

FOREIGN PATENT DOCUMENTS

| | | |
|---|---|---|
| DE | 469840 | 12/1928 |
| DE | 2832493 | 7/1978 |

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Timothy Vanoy
(74) *Attorney, Agent, or Firm* — Cynthia W. Flanigan

(57) ABSTRACT

An ammonia recovery system and method for removing ammonia from a gas stream is provided. The system includes an ammonia recovery vessel for contacting a solution, having a dissolved acidic salt, with the gas stream, having ammonia. The dissolved acidic salt solution absorbs the ammonia in the gas stream to provide an ammonia-lean gas stream and an ammonia-rich solution. The ammonia-rich solution is heated within an ammonia stripper to release the ammonia from the ammonia-rich solution to thereby generate an ammonia-rich gas stream and the solution having dissolved acidic salt. A heat exchanger heats the dissolved acidic salt from the ammonia stripper prior to the solution being provided to the ammonia recovery system. The acidic salt has a low thermal decomposition.

20 Claims, 3 Drawing Sheets

(56) References Cited

U.S. PATENT DOCUMENTS

| | | |
|---|---|---|
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii et al. |
| 5,354,545 A | 10/1994 | Buisman |
| 5,378,442 A | 1/1995 | Fujii et al. |
| 5,427,759 A | 6/1995 | Heitmann |
| 5,453,115 A | 9/1995 | Vuletić |
| 5,458,663 A | 10/1995 | Teague et al. |
| 5,462,583 A | 10/1995 | Wood et al. |
| 5,533,338 A | 7/1996 | Lee et al. |
| 5,599,508 A | 2/1997 | Martinelli et al. |
| 5,648,053 A | 7/1997 | Mimura et al. |
| 5,700,311 A | 12/1997 | Spencer |
| 5,736,115 A | 4/1998 | Iijima et al. |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,228,145 B1 | 5/2001 | Falk-Pedersen et al. |
| 6,258,151 B1 | 7/2001 | Häarle et al. |
| 6,344,177 B1 | 2/2002 | Littleford |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,667,347 B2 | 12/2003 | O'Rear et al. |
| 6,689,332 B1 | 2/2004 | Yoshida et al. |
| 6,720,359 B2 | 4/2004 | O'Rear et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,192,468 B2 | 3/2007 | Mak et al. |
| 7,204,867 B2 | 4/2007 | Nielsen et al. |
| 7,244,405 B2 | 7/2007 | Thielert |
| 7,255,842 B1 | 8/2007 | Yeh et al. |
| 7,377,967 B2 | 5/2008 | Reddy et al. |
| 7,424,808 B2 | 9/2008 | Mak |
| 7,485,275 B2 | 2/2009 | Asprion et al. |
| 7,597,746 B2 | 10/2009 | Mak et al. |
| 7,637,987 B2 | 12/2009 | Mak |
| 7,758,673 B2 | 7/2010 | Brok et al. |
| 7,892,509 B2 | 2/2011 | Iijima et al. |
| 7,927,403 B2 | 4/2011 | Versteeg et al. |
| 8,470,077 B2 | 6/2013 | Dube et al. |
| 8,814,988 B2 * | 8/2014 | Casara ............................ 95/178 |
| 2001/0006614 A1 * | 7/2001 | Nero et al. ..................... 423/238 |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0150813 A1 | 7/2006 | Tognazzo |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |
| 2010/0021362 A1 | 1/2010 | Hunwick |
| 2010/0092359 A1 | 4/2010 | Svendsen et al. |
| 2010/0107875 A1 | 5/2010 | Koss et al. |
| 2010/0229723 A1 | 9/2010 | Gelowitz et al. |
| 2012/0195816 A1 * | 8/2012 | Dube et al. ..................... 423/220 |
| 2013/0175004 A1 | 7/2013 | Dube et al. |

FOREIGN PATENT DOCUMENTS

| | | |
|---|---|---|
| DE | 3633690 | 4/1988 |
| EP | 0243778 | 11/1987 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 02/09849 | 2/2002 |
| WO | 2005/087351 | 9/2005 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. and Management, May 31, 2004 (approx.), pp. 89-104, vol. 4, Nos. ½.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

* cited by examiner

SYSTEM AND METHOD FOR RECOVERING AMMONIA FROM A CHILLED AMMONIA PROCESS

TECHNICAL FIELD

The present disclosure generally relates to systems and processes for carbon dioxide ($CO_2$) capture entrained in flue gases. More particularly, the present disclosure relates to the recovery of ammonia from the flue gas exiting a chilled ammonia process in a carbon capture system.

BACKGROUND

Most of the energy used in the world is derived from the combustion of carbon and hydrogen-containing fuels such as coal, oil and natural gas. In addition to carbon and hydrogen, these fuels contain oxygen, moisture and undesirable contaminants such as $SO_X$, e.g., $SO_2$, $SO_3$ and the like, $NO_X$, mercury, chlorine, and other trace elements. Awareness regarding the damaging effects of the contaminants released during combustion triggers the enforcement of ever more stringent limits on emissions from power plants, refineries and other industrial processes. There is an increased pressure on operators of such plants to achieve near zero emission of contaminants.

It has been shown that ammonia, as well as amine solutions, efficiently removes $CO_2$, as well as other contaminants, such as sulfur dioxide ($SO_2$) and hydrogen chloride (HCl), from a flue gas stream. In one particular application, $CO_2$ is absorbed in an ammoniated solution at temperatures lower than the exit temperature from a flue gas desulfurization system. The SOx contaminants, e.g., $SO_2$, $SO_3$, remaining in the flue gas coming from the wet flue gas desulfurization (WFGD) and/or dry flue gas desulfurization (DFGD) is often captured by ammonia to produce an ammonium sulfate bleed stream. Ammonium sulfate is also produced in the ammonia reduction stages of the carbon capture from the exhaust flue gas. For instance, a current solution to capture ammonia exiting from the absorber of a carbon capture system is a two-step process. In the first step, the ammonia is captured in a water wash system and in the second step the residual ammonia is captured in the column of a Direct Contact Heater (DCH) by using sulfuric acid. The captured residual ammonia with sulfuric acid produces ammonium sulfate salt.

Ammonium sulfate can be used as a commercial fertilizer, but processing of the ammonium sulfate byproduct can be energy and capital cost intensive. In addition, a large area for silos\bins for indoor storage of the ammonium sulfate byproduct may be needed on-site to insure plant availability. In addition, trace metals may be present in the ammonium sulfate stream that may require further treatment or disposal of the ammonium sulfate stream as a hazardous waste. The result is higher operating costs and capital costs because of the larger equipment needed to account for sulfur and the higher reagent make-up rates. Unfortunately, it has been found that the ammonium sulfate by-product does not offer much value to the customers. It has become more of a liability to the customers.

FIG. 1 illustrates such a known system 10 for removing contaminants from a flue gas produced by combustion of a fuel, such as coal, oil or natural gas in a boiler of a plant, such as a power plant, which produces ammonium sulfate. The system 10 includes a Direct Contact Cooler (DCC) 12, a carbon dioxide ($CO_2$) removal system 14, a water wash system 16 and a Direct Contact Heater (DCH) 18. The flue gas may be treated prior to being provided to the DCC 12 by a desulfurization system (known as wet flue gas desulfurization systems ("WFGD") and dry flue gas desulfurization systems ("DFGD")), particulate filters (including, for example, bag houses, particulate collectors, and the like), as well as the use of one or more sorbents that absorb contaminants from the flue gas. Examples of sorbents include, but are not limited to, activated carbon, ammonia, limestone, sodium bicarbonate, Trona, and the like.

The DCC 12 of the system 10 in FIG. 1 receives a gas stream, such as flue gas, via a gas inlet 20 at the bottom of a gas-liquid contacting device 26. The gas-liquid contacting device, also referred to as the sulfur removal device 26, is configured to remove $SO_2$ from the flue gas. In the sulfur removal device 26, flue gas is forwarded upwards and contacted with a liquid comprising ammonia having a pH-value of approximately 4-6 at flue gas saturation temperature. The liquid is supplied via pipe 30 and distributed over the sulfur removal device by a set of nozzles 32 or pipes with holes for liquid distribution. The sulfur removal device 26 contains a structured packing, or another suitable gas-liquid contacting filling.

$SO_2$, and optionally other acidic gases such as HCl, HF, $SO_3$, is removed from the flue gas by formation of ammonium sulfate upon contact with the ammonia comprised in the liquid. The used liquid, containing ammonium sulfate, is collected in a liquid collection receptacle at the bottom of the sulfur removal device. Dissolved ammonium sulfate is removed by a bleed stream 34. The remaining liquid is, via pipe 30, directed for reuse in the sulfur removal device 26. Ammonia make-up is required in this section for the capture of the incoming acidic gases.

The flue gas, depleted in $SO_2$, leaving the sulfur removal device 26 enters another gas-liquid contacting device 28 via the liquid collection receptacle 36. The gas-liquid contacting device 28, containing a structured packing, or another suitable gas-liquid contacting filling, is also referred to as the gas cooling device 28. In the gas cooling device 28, the flue gas depleted in $SO_2$, while forwarded upwards, directly contacts with a cooling liquid. The cooling liquid consisting essentially of water is supplied via pipe 38 and distributed by a set of nozzles 40, or pipes with holes for liquid distribution, over the gas cooling device. The gas cooling device 28 thus functions as a heat-exchanging device by transferring heat from the flue gas to the cooling liquid. In addition, any water in the flue gas is condensed therefrom. The stream 38 can be sent to either a cooling tower or mechanical chiller or the combination of both cooling tower and mechanical chiller before returning it back to the gas cooling device 28.

The thus heated liquid formed in the gas cooling device 28 is collected in the liquid collection receptacle 36, withdrawn via pipe 42 and forwarded for use in the DCH 18 as described below. The DCC 12 of FIG. 1 thus provides a cool and $SO_2$ depleted flue gas for supply via duct 44 to the carbon dioxide removal system 14.

The flue gas then leaves the DCC 12 via a duct 44 to the carbon dioxide removal system 14. The flue gas in the duct 44 has a temperature of about 0-40° C., specifically 0-5° C. As mentioned previously, the type of carbon dioxide removal system 14 described herein is sometimes referred to as the chilled ammonia process (CAP).

The carbon dioxide removal system 14 comprises a $CO_2$ absorber 46 in which the flue gas is brought into contact with an ammoniated slurry or solution. A pipe 47 is configured to forward, by means of a high pressure pump (not shown), a $CO_2$ enriched slurry or solution from the $CO_2$ absorber 46 to a regenerator 48. Heat is provided to the regenerator 48 by heating stream 50 in (reboiler) 52. The high pressure and high temperature in the regenerator 48 causes the release of high-pressure gaseous $CO_2$, stream 54. A pipe 56 is configured to return $CO_2$-lean ammoniated solution or slurry from the regenerator 48 to the $CO_2$ absorber 46. Heat exchangers 58 can be disposed between the absorber 46 and the regenerator 48 to control the temperature of the streams in pipes 47 and 56 circulating between the two components. There might be more heat exchangers configured between absorber 46 and regenerator 48 to provide heating or cooling requirements of the process as needed.

A duct 64 is configured to forward the flue gas, now having a low concentration of carbon dioxide, from the $CO_2$ absorber 46 to a water wash vessel 60 of the water wash system 16, which is operative for removing ammonia, $NH_3$, from the flue gas that has been treated in the $CO_2$ absorber. A stream of cold water or cold and slightly acidic solution is cooled in a heat exchanger 62 and is supplied to the water wash vessel 60. A duct 74 is configured to forward the flue gas, which has been cleaned in the water wash vessel 60, to the DCH 18 for further removal of the ammonia from the flue gas by means of sulfuric acid.

An ammonia stripper 66 can be disposed in fluid communication with the water wash vessel 60. The ammonia stripper 66 is configured to recover the ammonia captured from the flue gas in the water wash vessel 60. In the ammonia stripper 66, water stream, now containing the ammonia removed from the flue gas, can be heated at a temperature by a (reboiler) 67 which boils off the contaminants to form a stripper off gas stream 68 comprising ammonia, CO2 and water while the remaining liquid phase can continue back through the water wash vessel 60. The stripper off gas stream 68 may be provided back to the absorber 46 to recovery the ammonia and some $CO_2$ and water. Similar to the absorber 46 and regenerator 48 pair, heat exchangers 62 can be disposed between the water wash vessel 60 and the ammonia stripper 66 to control the temperatures of the streams circulating between the two components. There might be more heat exchangers configured between the water wash vessel 60 and stripper 66 to provide heating or cooling requirements of the process as needed.

The DCH 18 thus receives $CO_2$ depleted flue gas and an ammonia content of, for example, 200 ppm, from the water wash system 16. The DCH comprises at least a first gas-liquid contacting device 72, also referred to as the ammonia removal device, which is arranged to receive the flue gas supplied via duct 74. The ammonia removal device 72 is arranged to, at least partly; remove ammonia from the flue gas by bringing the flue gas into direct contact with acidic liquid comprising ammonium sulfate. The acidic liquid is supplied via pipe 76 and distributed over the ammonia removal device 72 by a set of nozzles 77, or by pipes with holes for liquid distribution. The flue gas enters at the bottom of the device 72 and is forwarded upwards through the device. In the ammonia removal device 72, which contains a structured packing or another suitable gas-liquid contacting filling, the flue gas is contacted with the liquid having a low temperature. Ammonium sulfate is formed in the liquid and removed by bleed stream 78. The remaining acidic liquid is, via pipe 76, directed for reuse in the ammonia removal device 72. Make-up liquid is required in this section for the capture of the incoming acidic gases.

The flue gas depleted in ammonia is forwarded from the ammonia removal device 72 to a second gas-liquid contacting device 80 of the DCH 18. The second gas-liquid contacting device 80 is also referred to as the gas heating device. The flue gas passes through the liquid collection receptacle 82, in which the liquid used in the gas heating device 80 is collected. The gas heating device 80, containing a structured packing or another suitable gas-liquid contacting filling, is arranged to bring the flue gas, having essentially the same temperature as when entering the ammonia removal device, into direct contact with a heating liquid. The heating liquid, supplied via pipe 42 and distributed over the device 80 by a set of nozzles 84 or by pipes with holes for liquid distribution, is essentially the same liquid as used for cooling in the gas cooling device 28 of the DCC 12. When the liquid is contacted with the flue gas in the gas heating device 80, heat is transferred from the liquid to the flue gas. The cleaned and heated flue gas, having a temperature of, e.g. 40-60° C., leaves the gas heating device via duct 70 and is released to a stack (not shown). The used liquid, having a lower temperature after passing the device 80 as compared to before entering the device, is collected in the liquid collection receptacle 82, withdrawn via pipe 38 and directed for use in the gas cooling device 28 of the DCC 12, optionally via a process cooling tower (not shown). The DCC 18 thus provides post-cleaning of the flue gas by removal of ammonia and heating of the flue gas, before releasing a cleaned and heated flue gas to stack.

A similar known system for removing contaminants from a flue gas produced by combustion of fuel in a boiler of a power plant is described in US patent publication no. US 2013/0175004 A1, which is incorporated by reference in its entirety.

Accordingly, there is a need in the art for improved systems and processes to eliminate or significantly reduce the production of the ammonium sulfate byproduct and recovering the ammonia in carbon capture systems.

SUMMARY

According to the aspects illustrated herein, there is provided an ammonia recovery system for removing ammonia from a gas stream. The system includes an ammonia recovery vessel for contacting a solution having a dissolved acidic salt with the gas stream having ammonia wherein the dissolved acidic salt solution absorbs the ammonia in the gas stream to provide an ammonia-lean gas stream and an ammonia-rich solution. An ammonia stripper includes a vessel that receives and heats the ammonia-rich solution from the vessel to release the ammonia from the ammonia-rich solution to generate an ammonia-rich gas stream comprising ammonia and water, and the solution having dissolved acidic salt. A heat exchanger receives the dissolved acidic salt solution from the ammonia stripper and heats the solution prior to the solution being provided to the vessel. The acidic salt has a low thermal decomposition.

According to another aspect illustrated herein, there is provided a method of removing ammonia from a gas stream. The method includes contacting within a first vessel a solution having a dissolved acidic salt with the gas stream having ammonia wherein the dissolved acidic salt solution absorbs the ammonia in the gas stream to provide ammonia-lean gas stream and an ammonia-rich solution. The ammonia-rich solution is heated within a second vessel to release the ammonia from the ammonia-rich solution to generate an ammonia rich gas stream comprising ammonia and water, and a solution having dissolved acidic salt. The dissolved acidic salt solution is heated and provided back to the first vessel, wherein the acidic salt has a low thermal decomposition.

The above described and other features are exemplified by the following figures and detailed description.

BRIEF DESCRIPTION OF THE DRAWINGS

Referring now to the Figures, which are exemplary embodiments, and wherein the like elements are numbered alike.

DETAILED DESCRIPTION

Figure 1:
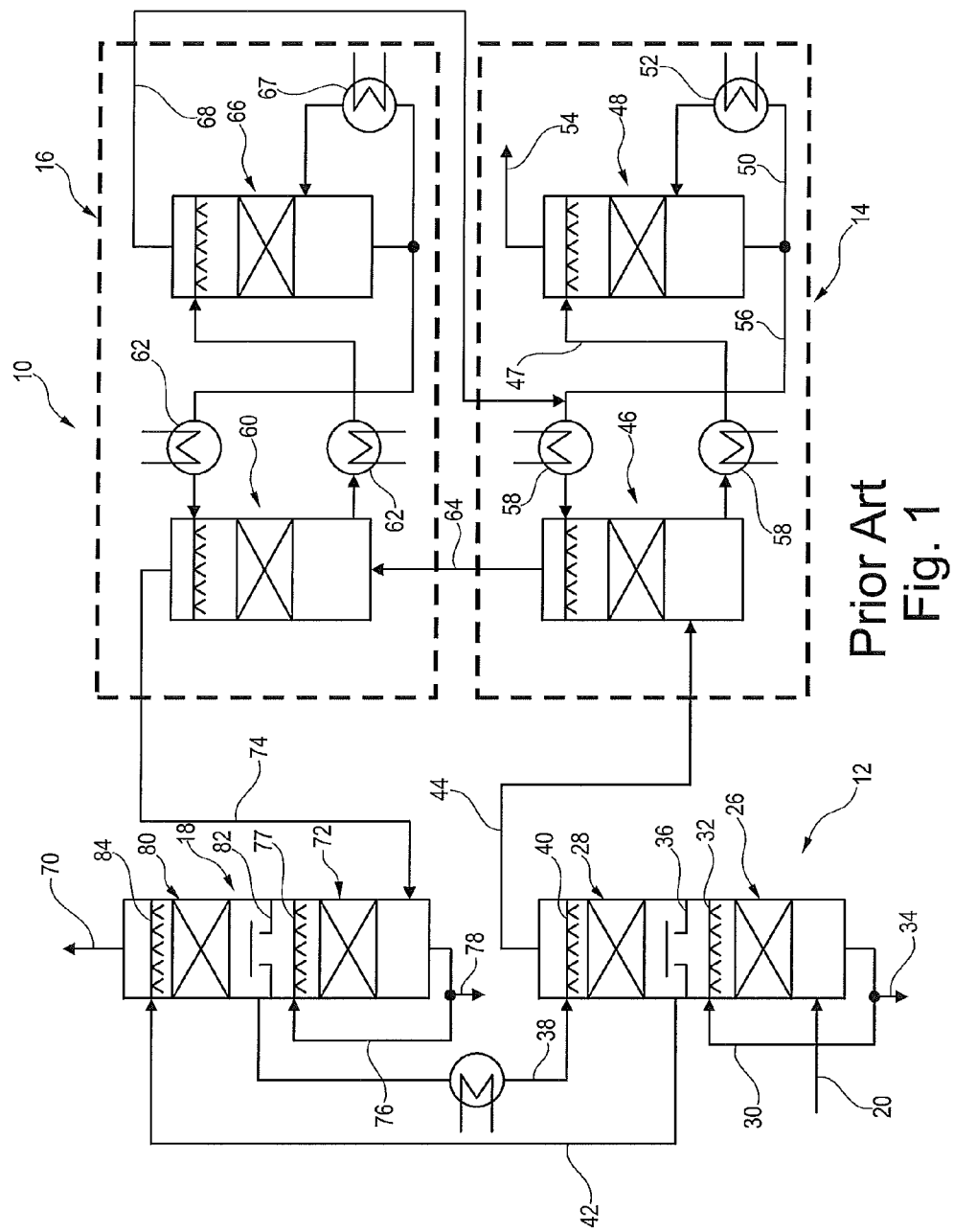
FIG. 1 is a schematic diagram of a system for receiving carbon dioxide and ammonia from a flue gas stream of known prior art.

Disclosed herein is a system and process for eliminating the ammonium sulfate byproduct of the acid gas capture and ammonia reduction stages of the chilled ammonia processes ("CAP") in a carbon capture system ("CCS"). The carbon capture system 100 of FIG. 2 combines the two-step process of the ammonia recovery by the water wash system and the direct contact heater (DCH), as shown in FIG. 1, into a single step process. The system 100 eliminates the water wash process 16 and the heating stage 80 of the DCH of FIG. 1.

Figure 2:
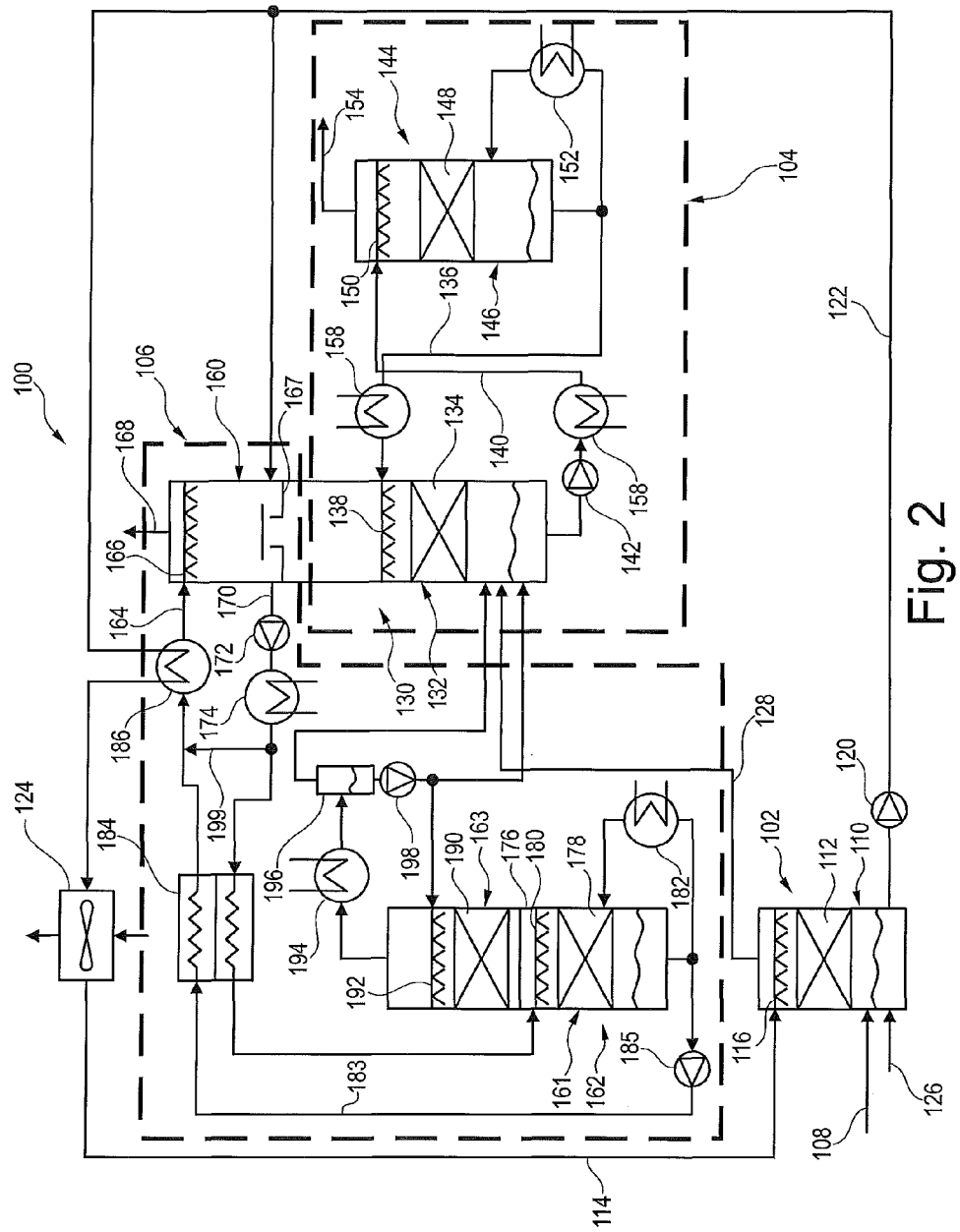
FIG. 2 is a schematic diagram of a system for receiving carbon dioxide and ammonia from a flue gas stream in accordance with the present invention.

The carbon capture system 100 of FIG. 2 removes contaminants from a flue gas produced by combustion of a fuel, such as coal, oil or natural gas in a boiler of a plant, such as a power plant. The system 100 includes a Direct Contact Cooler (DCC) 102, a carbon dioxide ($CO_2$) removal system 104, and a Direct Contact Heater (DCH) 106.

The DCC 102 of the system 100 in FIG. 2 receives a gas stream, such as flue gas, via a gas inlet 108 at the bottom of the DCC 102. The flue gas may be pre-treated by a desulfurization system, a particulate filter, and/or use of one or more sorbents.

The DCC 102 includes a gas-liquid contacting vessel 110, containing a structured packing 112, or another suitable gas-liquid contacting filling. In the DCC 102, the flue gas flows upwards through the vessel 110 directly contacting a cooling liquid flowing downwards. The cooling liquid consisting essentially of water is supplied via pipe 114 and distributed by a set of nozzles 116, or pipes with holes for liquid distribution, over the structured packing. The DCC 102 thus functions as a heat-exchanging device by transferring heat from the flue gas to the cooling liquid. In addition, the cooling liquid condenses water from the flue gas. The heated water formed in the DCC 102 is collected at the bottom of the contacting vessel 110, withdrawn via pipe 122 and may be provided by a pump 120 to the DCH 106 via pipe 122 (as a make-up water). The water may then be further cooled via a cooling device 124, such as a cooling tower or mechanical chiller or the combination of both the cooling tower and mechanical chiller before returning the water back to the DCC 106 via pipe 114, which will be described in greater detail hereinafter. Additional cooling liquid may be provided to the DCC via pipe 126. The example shown in FIG. 2 is for the combined cycle power plant based on natural gas and hence, the acidic gases removal stage is not shown. However, residual acidic gases removal (remained after desulfurization stage) might be needed similar to the system as shown in FIG. 1. In this case, the acidic gases might be removed by using either ammonia or any other reagents such as caustic before the flue gas enters the cooling stage 112 as shown in FIG. 2.

The DCC 102 of FIG. 2 thus provides a cool flue gas for supply via duct 128 to the carbon dioxide removal system 104. The flue gas in the duct 128 has a temperature of about 0-40° C., specifically 0-5° C. As mentioned previously, the type of carbon dioxide removal system 104 described herein is sometimes referred to as the chilled ammonia process (CAP).

The carbon dioxide removal system 104 comprises a $CO_2$ absorber 130 in which the flue gas is brought into contact with an ammoniated slurry or solution. The $CO_2$ absorber 130 includes a gas-liquid contacting vessel 132, containing a structured packing 134, or another suitable gas-liquid contacting filling. In the $CO_2$ absorber 130, the flue gas flows upwards through the vessel 132 directly contacting a cooled ammoniated slurry or solution flowing downwards. The ammoniated slurry or solution consisting essentially of ammonia and water is supplied via pipe 136 and distributed by a set of nozzles 138, or pipes with holes for liquid distribution, over the structured packing 134. The ammoniated solution or slurry absorbs the $CO_2$ to provide a $CO_2$-rich ammoniated solution or slurry and a $CO_2$-lean flue gas.

A pipe 140 is configured to provide, by means of a high pressure pump 142, the $CO_2$-rich slurry or solution from the $CO_2$ absorber 130 to a regenerator 144. The regenerator includes a gas-liquid contacting vessel 146, containing a structured packing 148, or another suitable gas-liquid contacting filling. The $CO_2$-rich ammoniated slurry or solution is distributed by a set of nozzles 150, or pipes with holes for liquid distribution, over the structured packing 148. Heat is provided to the regenerator 146 by heating stream from reboiler 152. The high pressure and high temperature in the regenerator 144 causes the release of high-pressure gaseous $CO_2$, stream via duct 154. A pipe 136 is configured to return $CO_2$-lean ammoniated solution or slurry from the regenerator 144 to the $CO_2$ absorber 130. Heat exchangers 158 can be disposed between the absorber 130 and the regenerator 144 to control the temperatures of the streams in pipes 140 and 136 circulating between the two components and also to reduce the energy consumption in the regenerator 144. There might be more heat exchangers configured between absorber 130 and regenerator 144 to provide heating or cooling requirements of the process as needed, similar to that shown in U.S. Pat. No. 8,470,077, which is incorporated by reference.

While the $CO_2$ absorber 130 of FIG. 2 has a single absorber stage, the present invention contemplates that the $CO_2$ absorber may include at least one or four additional absorber stages (not shown) disposed above or downstream of, in reference to the flow of the flue gas, the first absorber stage shown. Each additional stage may include structured packing, similar to the first stage, wherein $CO_2$-rich ammoniated solution or slurry is recycled back to the CO2 absorber 130 and respectively distributed by a set of nozzles or pipes with holes over each respective structured packing. Further, the ammoniated slurry or solution recycled back to the additional stages of the $CO_2$ absorber may be cooled by respective heat exchangers.

The $CO_2$-lean flue gas exiting the $CO_2$ absorber further comprises residual ammonia from the absorption process. The $CO_2$ lean flue gas is provided to the DCH to remove the residual ammonia from the flue gas. The DCH 106 includes an ammonia removal device 160 and an ammonia stripper 162. In the embodiment shown in FIG. 2 the ammonia removal device 160 of the DCH 106 is disposed the vessel 132 in the upper portion or the downstream portion of the $CO_2$ absorber 130, in reference to the direction of flow of the flue gas. The DCH 106 thus receives $CO_2$ depleted flue gas having an ammonia content of, for example, 5,000-15,000 ppm, and typically 10,000 ppm, from the $CO_2$ absorber 130. The ammonia removal device 160 of the DCH 106 is arranged to receive the flue gas supplied flowing upward through the vessel 132. The ammonia removal device 132 is arranged to remove ammonia from the flue gas by bringing the flue gas into direct contact with acidic liquid comprising an ammoniated salt having a lower heat of reaction than ammonium sulfate salt. For example, such ammoniated salts having lower heat reaction (or decomposition) than ammonium sulfate salt includes ammonium acetate, ammonium phosphate and any other ammonium salts having a low heat reaction. The acidic liquid is supplied via pipe 164 and distributed throughout the ammonia removal device 160 by a set of nozzles 166, or by pipes with holes for liquid distribution. The flue gas enters at the bottom of the ammonia removal device 160 through a liquid collection receptacle 167 and comes in contact with the acidic liquid as the flue gas flows upward and the acidic gas flows downward through the ammonia removal device 160. The acidic liquid absorbs ammonia in the flue gas to provide a clean flue gas, having an ammonia content of approximately 5 ppm, with at least reduced ammonia via duct 168 and an acidic liquid having ammonium salt. The liquid collection receptacle collects the acidic liquid used in the ammonia removal device 160. While the ammonia removal device 160 does not include structured packing, the invention contemplates that the ammonia removal device may contain a structured packing or another suitable gas-liquid contacting filling. Further, while the CO2 absorber 130 and ammonia removal device 160 are provided within a single vessel, the present invention contemplates that these devices may be provided in separate, discrete vessels interconnected by a duct.

The acidic liquid is, via pipe 170, provided by pump 172 to the ammonia stripper 162 for recovering ammonia and steam from the acidic liquid. The acidic liquid may be pre-heated prior to entering the ammonia stripper by a heat exchanger 174, which raises the temperature to about 10-30° C. The heat supplied in the heat exchanger 174 can be from the $CO_2$ loaded rich solution at 140 or the $CO_2$ lean solution at 136, similar to that described in US publication no. US 2013/175004.

The stripper 162 includes a gas-liquid contacting vessel 176, which includes an ammonia stripper section 161 and a rectifying section 163. The ammonia stripper section 161 contains a structured packing 178, or another suitable gas-liquid contacting filling. The acidic liquid is distributed by a set of nozzles 180, or pipes with holes for liquid distribution, over the structured packing 178. Heat is provided to the ammonia stripper 162 by heating stream from reboiler 182. The high pressure and high temperature in the stripper 162 causes the release of high-pressure gaseous $NH_3$ and steam. The present invention contemplates that the stripper may also operate under a vacuum or atmospheric pressure, i.e., vacuum—30 bar, depending on the acid being used therein. The acidic liquid collected at the bottom of the stripper 162 is returned by pump 185 to the ammonia removal device 160 via a pipe 183. The heat of the ammonia-lean acidic liquid may be used to heat to the ammonia-rich acidic liquid through a heat exchanger 184. The cooled ammonia-lean acidic liquid is heated by a heat exchanger 186 to about 30-60 degrees Celsius before being distributed in the ammonia removal device 160 by the array of nozzles 166. The heat exchanger 186 is in fluid communication with the DCC 102. Specifically, the liquid provided to cool the flue gas in the DCC 102 is provided by pump 120 to the heat exchanger 186 to heat the ammonia-lean acidic liquid provided to the ammonia removal device 160, while cooling the cooling liquid. The cooling liquid is then provided to a chiller and/or a cooling tower 124 to further cool the cooling water before being provided back to the DCC 102 for cooling the flue gas. A portion of the heated water from the DCC 102 may also be provided to the ammonia removal device 160 to make up for evaporated water in the DCH 106. Overall, the DCH 106 absorbs the ammonia from the flue gas to form ammonium salt, which is decomposed in the stripper to recover ammonia. Consequently the reagent (e.g., ammonia) requirement is eliminated, which thereby eliminates the salt byproduct (such as ammonium sulfate) and the need for sulfuric acid, as described in the prior art.

The rectifying section 163 of the ammonia stripper 162 is disposed above or downstream of the ammonia stripper section 161, which contains a structured packing 190, or another suitable gas-liquid contacting filling. The cooling liquid, specifically condensed steam, is distributed by a set of nozzles 192, or pipes with holes for liquid distribution, over the structured packing. The ammonia gas and steam is cooled by the cooling liquid as the ammonia gas and steam and the cooling liquid flow in countercurrent direction through the structured packing 190. The cooled ammonia gas and steam is further cooled by a heat exchanger 194, wherein the steam is condensed from the ammonia gas and separated in a gas-liquid separation vessel 196. The condensed water may be recycled back to the rectifying section 163 of the ammonia stripper 162 and/or provided to the $CO_2$ absorber 106. Further the clean ammonia gas exiting the gas-liquid separator 196 may also be provided to the $CO_2$ absorber 106. As further shown in FIG. 2, a portion of the ammonia-rich solution exiting the heat exchanger 174 may be returned back via pipe 199 to the ammonia removal device 160 via the heat exchanger 186, and thus bypass the ammonia stripper 162. Depending on the stripper pressure, the heat from the heat exchanger 194 can be integrated with the power plant or any suitable place within the CAP process.

While the ammonia removal device 160 of the DCH 106 and CO2 absorber 130 are disposed within a common vessel 132, the present invention contemplates that these systems may be disposed in separate vessels fluidly connected.

Figure 3:
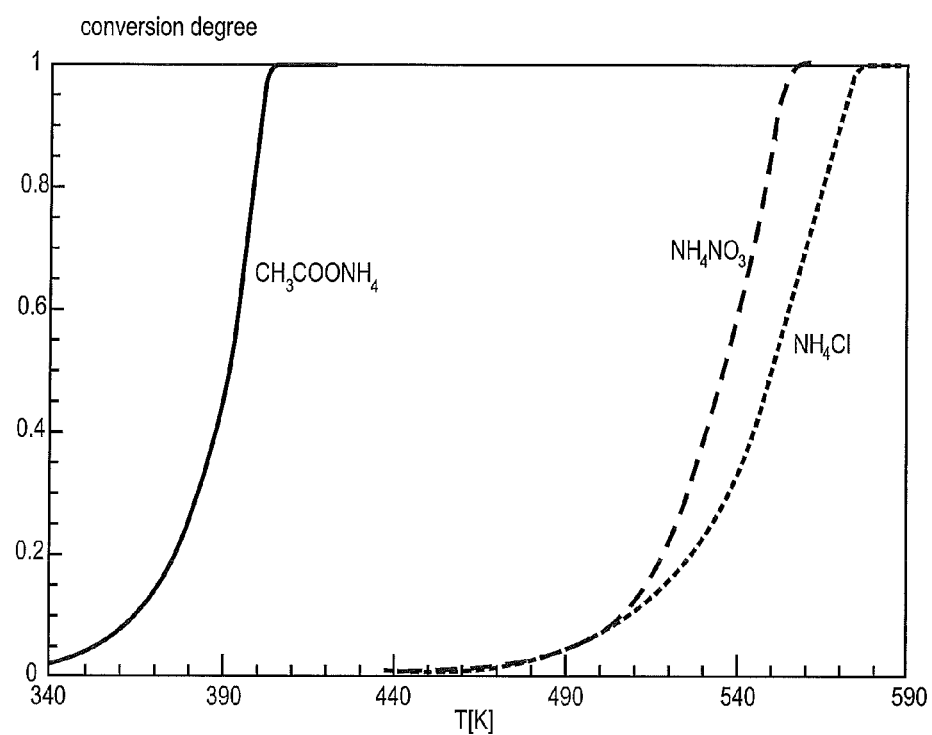
FIG. 3 is a plot representing the decomposition characteristics of various ammonium salts (does not include all possible salts).

FIG. 3 illustrates that the ammonium acetate salt ($CH_3COONH_4$) decomposes at a relatively low temperature compared to ammonium nitrate ($NH_4NO_3$) and ammonium chloride$NH_4CL$). As shown, complete conversion of ammonium acetate is achieved at about 125 degrees Celsius, and therefore, relatively low pressure steam can be used for the thermal recovery of ammonia from the ammonium acetate salt. The use of ammonium salts having low temperature decomposition permits relatively low pressure steam to be used for the thermal recovery of ammonia from such ammonia salts such as ammonium acetate salt and ammonium phosphate salt. The energy associated with the ammonium phosphate solution at 13 bar and 170° C. is in the same order of magnitude as the current high pressure stripper operation (as shown in FIG. 1). However, the energy reduces significantly as the stripper operating pressure reduces and hence, the energy associated with the ammonium phosphate solution can be reduced with the current CAP stripper operating conditions. While FIG. 3 shows the characteristics of a few ammonium salts, one will appreciate that other possible sals may be used with the present invention.

The present invention provides a carbon capture system that does not produce the typical ammonium sulfate by-product known in chilled ammonia processes, while providing other significant benefits. For instance, the present invention provides an alternative to the unwanted ammonium sulfate byproduct by decomposing the salt and recycling it to be re-used within the process. In this case, the cost associated with the byproduct processing can be eliminated. As shown, no reagent make-up is required, which will reduce the operating cost of the process significantly (both ammonia and H2S04 make-up can be eliminated). Consequently, the storage of large amounts of reagents on site is eliminated, and therefore it will be easier to deal with plant safety requirements.

Further, the elimination of the water wash system eliminates the water wash vessel and its associated packing, pumps, chillers resulting in significant capital and operating cost saving. As suggested, the second stage of the DCH can be eliminated, which is replaced by a heat exchanger, with no impact on the ammonia emissions. The size of the ammonia stripper 162 of the present invention would be significantly smaller than the current (depending on the acid use in the process such as acetic acid, phosphorous acid, etc.) water wash-stripper arrangements.

The present invention is depicted on CAP for combined cycle power plant based on natural gas, but it is also applicable in some ways on other processes such as CAP for a power plant based on coal and high pressure CAP systems. For CAP processes based on the combustion of coal or other fuels that produce SOx, the present invention contemplates that the DCC 102 shown in FIG. 2 may include a second stage for removing the SOx in the flue gas before being cooled, similar to that shown and described in FIG. 1.

The present invention has additional benefits for high pressure CAP applications, particularly when the $CO_2$ absorber 130 is at a greater pressure than the device, such as the stripper 162, that provides recycled ammonia back to the $CO_2$ absorber. As known in the prior art, the ammonia recycled from the water wash stripper 66 of FIG. 1 includes $CO_2$ and water. The pressurization of this recycled ammonia stream having $CO_2$, such as by a compressor, results in plugging and clogging of the compressor and other downstream devices. The present invention, however, can operate the stripper 162 at low pressure without this concern of clogging and plugging because the ammonia stream exiting stripper 162 is free or substantially free of $CO_2$. Consequently, the ammonia stream can be compressed without fouling the devices downstream of the stripper 162.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ammonia recovery system for removing ammonia from a gas stream, the system comprising:
   an ammonia recovery vessel for contacting a solution having a dissolved acidic salt with the gas stream having ammonia wherein the dissolved acidic salt solution absorbs the ammonia in the gas stream to provide ammonia-lean gas stream and an ammonia-rich solution;
   an ammonia stripper including a vessel that receives and heats the ammonia-rich solution from the vessel to release the ammonia from the ammonia-rich solution to generate an ammonia rich gas stream comprising ammonia and water, and the solution having dissolved acidic salt;
   a heat exchanger for receiving the dissolved acidic salt solution from the ammonia stripper and heating the solution prior to the solution being provided to the ammonia recovery vessel;
   wherein the acidic salt has a low thermal decomposition temperature.

2. The ammonia recovery system of claim 1, further includes a second heat exchanger for heating the ammonia-rich solution prior to entering the ammonia stripper.

3. The ammonia recovery system of claim 1, further includes a second heat exchanger that exchanges heat from the ammonia-lean solution from the ammonia stripper with the ammonia-rich solution provided to the ammonia stripper.

4. The ammonia recovery system of claim 1, wherein the acidic salt has a thermal decomposition temperature between 50 and 300 degrees Celsius.

5. The ammonia recovery system of claim 1, wherein the acidic salt includes at least one of ammonium acetate and ammonium phosphate.

6. The ammonia recovery system of claim 1, further includes a carbon capture system having an absorption vessel that contacts the gas stream with a chilled solution having ammonia to absorb $CO_2$ from the flue gas stream to generate a $CO_2$ rich solution and the gas stream having ammonia.

7. The ammonia recovery system of claim 1, wherein the gas stream is a flue gas stream from a combustion process.

8. The ammonia recovery system of claim 6, further includes a regeneration vessel for receiving the $CO_2$ rich solution and heating the solution to provide a $CO_2$ rich gas stream and a $CO_2$ lean absorption solution which is recycled back to the absorber vessel.

9. The ammonia recovery system of claim 1, further comprising a direct contact cooling vessel for cooling the gas stream prior to entering the absorption vessel.

10. The ammonia recovery system of claim 9, further comprising a pipe to provide the water from the direct contact cooling vessel to the second heat exchanger to preheat the ammonia-lean solution from the ammonia stripper prior to entering the ammonia recovery vessel.

11. A method of removing ammonia from a gas stream, the method comprising:
    contacting within a first vessel a solution having a dissolved acidic salt with the gas stream having ammonia wherein the dissolved acidic salt solution absorbs the ammonia in the gas stream to provide ammonia-lean gas stream and an ammonia-rich solution;
    heating within a second vessel the ammonia-rich solution to release the ammonia from the ammonia-rich solution to generate an ammonia rich gas stream comprising ammonia and water, and a solution having dissolved acidic salt;
    heating the dissolved acidic salt solution;
    providing the heated dissolved acidic salt solution back to the first vessel;
    wherein the acidic salt has a low thermal decomposition temperature.

12. The method of claim 11, further comprising heating the ammonia-rich solution prior to entering the second vessel.

13. The method of claim 11, further comprising exchanging heat from the ammonia-lean solution from the second vessel with the ammonia-rich solution provided to the second vessel.

14. The method of claim 11, wherein the acidic salt has a thermal decomposition temperature between 50 and 300 degrees Celsius.

15. The method of claim 11, wherein the acidic salt includes at least one of ammonium acetate and ammonium phosphate.

16. The method of claim 11, further comprising contacting in a third vessel the gas stream with a chilled solution having ammonia to absorb $CO_2$ from the flue gas stream to generate a $CO_2$ rich solution and the gas stream having ammonia.

17. The method of claim 11, wherein the gas stream is a flue gas stream from a combustion process.

18. The method of claim 16, further comprising heating the $CO_2$ rich solution to provide a $CO_2$ rich gas stream and a $CO_2$ lean absorption solution which is recycled back to the third vessel.

19. The method of claim 16, further comprising cooling in a fourth vessel the gas stream prior to entering the third vessel.

20. The method of claim 19, further comprising providing water from the fourth vessel to preheat the ammonia-lean solution from the second vessel prior to entering the first vessel.

\* \* \* \* \*